(12) United States Patent
Kwak et al.

(10) Patent No.: US 9,092,881 B2
(45) Date of Patent: Jul. 28, 2015

(54) COLOR INTERPOLATION APPARATUS

(75) Inventors: Boo Dong Kwak, Gyunggi-Do (KR); Bong Soon Kang, Busan (KR); Hyun Soo Kim, Busan (KR); Won Woo Jang, Busan (KR); Kyung Rin Kim, Busan (KR); Won Tae Choi, Gyunggi-Do (KR); Joo Young Ha, Gyeongsangnam-Do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 1470 days.

(21) Appl. No.: 12/476,516

(22) Filed: Jun. 2, 2009

(65) Prior Publication Data
US 2010/0150440 A1    Jun. 17, 2010

(30) Foreign Application Priority Data
Dec. 11, 2008    (KR) .................. 10-2008-0126012

(51) Int. Cl.
G06T 3/40    (2006.01)
G06T 7/00    (2006.01)
H04N 9/04    (2006.01)

(52) U.S. Cl.
CPC .............. *G06T 3/4015* (2013.01); *G06T 3/403* (2013.01); *H04N 9/045* (2013.01); *G06T 7/0085* (2013.01); *G06T 2207/10024* (2013.01); *G06T 2207/20012* (2013.01); *G06T 2207/20192* (2013.01); *H04N 2209/046* (2013.01)

(58) Field of Classification Search
USPC ......... 382/162, 167, 181, 190, 195, 199–200, 382/205, 224, 254–255, 260–261, 264, 382/266–270, 272–276, 282, 293, 382/298–300; 348/222.1, 240.2, 234, 237, 348/266–283, 441; 358/518–523
See application file for complete search history.

(56) References Cited

U.S. PATENT DOCUMENTS 7,139,022 B1 *  11/2006  Raffy ........................... 348/273
2006/0203292 A1 *  9/2006  Wu .............................. 358/3.26

(Continued)

FOREIGN PATENT DOCUMENTS

KR    1020060068503 A    6/2006
KR    10-2007-0103229 A    10/2007

OTHER PUBLICATIONS

Korean Office Action for application No. 10-2008-0126012, issued Jun. 28, 2010.

*Primary Examiner* — Kim Vu
*Assistant Examiner* — Nathan Bloom
(74) *Attorney, Agent, or Firm* — Lowe Hauptman & Ham LLP

(57) ABSTRACT

A color interpolation apparatus includes a threshold value determining unit that calculates a luminance value of each area set based on each pixel of a Bayer pattern image and determines edge determining threshold values, an edge information calculating unit that calculates pixel value variations in multiple directions of the set areas by using pixel values of pixels included in each area and edge information regarding each area by using the multiple directional pixel value variations, an area determining unit that determines an edge type by using the edge determining threshold values and the edge information, and a color interpolation unit that applies a color interpolation filter previously set according to the edge type to a corresponding area according to the edge type. The area determining unit uses green information or interpolated green information of a central pixel depending on whether or not a color of the central pixel is green.

16 Claims, 11 Drawing Sheets

(56) References Cited

U.S. PATENT DOCUMENTS

| | | | |
|---|---|---|---|
| 2008/0165206 A1* | 7/2008 | Wang | 345/611 |
| 2008/0298722 A1* | 12/2008 | Lee et al. | 382/300 |
| 2009/0010539 A1* | 1/2009 | Guarnera et al. | 382/167 |
| 2009/0136127 A1* | 5/2009 | Kwak et al. | 382/167 |
| 2009/0141999 A1* | 6/2009 | Peng et al. | 382/266 |
| 2009/0147099 A1* | 6/2009 | Kim et al. | 348/223.1 |
| 2009/0147111 A1* | 6/2009 | Litvinov et al. | 348/273 |
| 2012/0013772 A1* | 1/2012 | Ishiga | 348/241 |

* cited by examiner

| G1 | R6 | G11 | R16 | G21 |
|---|---|---|---|---|
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 2A

| R1 | G6 | R11 | G16 | R21 |
|---|---|---|---|---|
| G2 | B7 | G12 | B17 | G22 |
| R3 | G8 | R13 | G18 | R23 |
| G4 | B9 | G14 | B19 | G24 |
| R5 | G10 | R15 | G20 | R25 |

FIG. 2B

| B1 | G6 | B11 | G16 | B21 |
|---|---|---|---|---|
| G2 | R7 | G12 | R17 | G22 |
| B3 | G8 | B13 | G18 | B23 |
| G4 | R9 | G14 | R19 | G24 |
| B5 | G10 | B15 | G20 | B25 |

FIG. 2C

| G1 | B6 | G11 | B16 | G21 |
|---|---|---|---|---|
| R2 | G7 | R12 | G17 | R22 |
| G3 | B8 | G13 | B18 | G23 |
| R4 | G9 | R14 | G19 | R24 |
| G5 | B10 | G15 | B20 | G25 |

FIG. 2D

|     |     |     |     |     |
| --- | --- | --- | --- | --- |
| G1  | R6  | G11 | R16 | G21 |
| B2  | G7  | B12 | G17 | B22 |
| G3  | R8  | G13 | R18 | G23 |
| B4  | G9  | B14 | G19 | B24 |
| G5  | R10 | G15 | R20 | G25 |

|  |  |  |  |  |
|---|---|---|---|---|
| G1 | R6 | G11 | R16 | G21 |
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 9A

|  |  |  |  |  |
|---|---|---|---|---|
| G1 | R6 | G11 | R16 | G21 |
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 9B

|  |  |  |  |  |
|---|---|---|---|---|
| G1 | R6 | G11 | R16 | G21 |
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 9C

|  |  |  |  |  |
|---|---|---|---|---|
| G1 | R6 | G11 | R16 | G21 |
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 9D

| G1 | R6 | G11 | R16 | G21 |
|---|---|---|---|---|
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 10A

| G1 | R6 | G11 | R16 | G21 |
|---|---|---|---|---|
| B2 | G7 | B12 | G17 | B22 |
| G3 | R8 | G13 | R18 | G23 |
| B4 | G9 | B14 | G19 | B24 |
| G5 | R10 | G15 | R20 | G25 |

FIG. 10B

| R1 | G6 | R11 | G16 | R21 |
|---|---|---|---|---|
| G2 | B7 | G12 | B17 | G22 |
| R3 | G8 | G'13 | G18 | R23 |
| G4 | B9 | G14 | B19 | R24 |
| R5 | G10 | R15 | G20 | R25 |

FIG. 11A

| R1 | G6 | R11 | G16 | R21 |
|---|---|---|---|---|
| G2 | B7 | G12 | B17 | G22 |
| R3 | G8 | G'13 | G18 | R23 |
| G4 | B9 | G14 | B19 | R24 |
| R5 | G10 | R15 | G20 | R25 |

COLOR INTERPOLATION APPARATUS

CROSS-REFERENCE TO RELATED APPLICATIONS

This application claims the priority of Korean Patent Application No. 2008-0126012 filed on Dec. 11, 2008, in the Korean Intellectual Property Office, the disclosure of which is incorporated herein by reference.

BACKGROUND OF THE INVENTION

1. Field of the Invention

The present invention relates to a color interpolation apparatus for determining color values of pixels of a bayer pattern inputted from a single image sensor and, more particularly, to a color interpolation apparatus capable of accurately interpolating color of pixels in consideration of various directionalities of edge components of an image.

2. Description of the Related Art

In general, a digital camera, a camcorder, a camera phone, and the like, generates images by using an image sensor such as a charge coupled device (CCD), a complementary metal-oxide semiconductor (CMOS), and the like. The image sensor receives light via a photodiode or a photo transistor, generates an electrical signal according to the received light, converts the electrical signal into an electrical digital image signal by using an analog/digital converter, and outputs the converted signal.

A color image can be expressed with at least three colors of green, red, blue, the three primary color elements, at each pixel. Thus, in order to display a color image, three image sensors plus color filters for receiving each color and driving circuits for driving each sensor are required. For example, a broadcast equipment, a high-performance camera, etc. expresses a color image by using three image sensors. However, most digital cameras and camera phones express a color image by using a single image sensor to reduce the size and costs. The image sensor has a function of converting a signal of light into an electrical signal, and the signal inputted from the image sensor is a black and white image with only brightness information of a subject, not a color image. Thus, in order to express a color image by using the single image sensor, the image sensor needs a special filter arrangement called a color filter array (CFA). Among color filter arrays, a color filter array of a bayer pattern is the most commonly used color filter array. With the color filter array of the bayer pattern, a single pixel can obtain only single color information, and the pattern includes red-green repeated rows and green-blue repeated rows which are alternately disposed repeatedly. When the color filter array of such bayer pattern is in use, a bayer pattern image with pixels each having only one color information of the three red, green, and blue colors is outputted. Thus, in order to obtain a complete color image, a process of recovering the other two remaining color information a corresponding pixel does not have by using the color information of the corresponding pixel and color information of its neighbor pixels is required. The process of generating the color image by recovering the three color information with respect to each pixel of the bayer pattern image outputted from the image sensor is called color interpolation or demosaicking.

Various researches have been conducted so far on the color interpolation scheme, and diverse color interpolation methods have been known, including a method of simply interpolating color with an average value of color values of neighbor pixels and a color interpolation method of applying various algorithms according to the presence or absence of an edge and the directionality of an edge. The color interpolation scheme may be applicable in various manners depending on diverse elements such as the directionality of an edge present in an image to be color-interpolated, the luminance of the image, a type of an image sensor, and the like, and in this sense, research and development of the color interpolation scheme needs to be continued.

SUMMARY OF THE INVENTION

An aspect of the present invention provides a color interpolation apparatus capable of accurately and quickly performing color interpolation on a bayer pattern image in consideration of the luminance of an image or various directionalities of edges.

According to an aspect of the present invention, there is provided a color interpolation apparatus including: a threshold value determining unit that calculates a luminance value of each of a plurality of areas set based on each pixel of a bayer pattern image generated by an image sensor, and determines edge determining threshold values used for determining each edge of the set areas; an edge information calculating unit that calculates pixel value variations in multiple directions of horizontal, vertical, diagonal, and central directions of the corresponding set areas by using pixel values of pixels included in each set area, and calculates edge information regarding each set area by using the calculated multi-directional pixel value variations; an area determining unit that determines a type of an edge present in each set area by using the edge determining threshold values detered by the threshold value determining unit and the edge information calculated by the edge information calculating unit; and a color interpolation unit that applies a color interpolation filter previously set according to the edge types to a corresponding set area according to the edge types determined for each region set by the area determining unit.

The color interpolation apparatus may further include: a bayer pattern data storage unit that stores the entire bayer pattern data inputted from the image sensor in the form of the plurality of region set based on each pixel of the bayer pattern data.

The threshold value determining unit may obtain a luminance value of each color by using pixel values of each color pixel included in each set area, and calculate the overall luminance value of each set area by using the luminance value of each color.

The edge information calculating unit may calculate a vertical-directional variation of each set area by adding a vertical-directional variation between a central pixel and pixels disposed at a column including the central pixel of each set area and a vertical-directional variation between pixels included in a column adjacent left and right to the central pixel.

The edge information calculating unit may calculate a horizontal-directional variation of each set area by adding a horizontal-directional variation between a central pixel and pixels disposed at a row including the central pixel of each set area and a vertical-directional variation between pixels included in a column adjacent up and down to the central pixel.

The edge information calculating unit may calculate a left-upward diagonal-directional variation of each set area by adding a left-upward diagonal-directional variation between a central pixel and pixels disposed at a left-upward diagonal line including the central pixel of each set area and a left-upward diagonal-directional variation between pixels disposed in parallel adjacent to the left-upward diagonal line including the central pixel.

The edge information calculating unit may calculate a right-upward diagonal-directional variation of each set area by adding a right-upward diagonal-directional variation between a central pixel and pixels disposed at a right-upward diagonal line including the central pixel of each set area and a right-upward diagonal-directional variation between pixels disposed in parallel adjacent to the right-upward diagonal line including the central pixel.

The edge information calculating unit may calculate a central directional variation by using a central pixel of each set area and pixels adjacent to the central pixel in a diagonal direction.

The color interpolation unit may receive a control signal including information about an edge type of each set area inputted from the area determining unit, and perform a bit shift operation to apply a value corresponding to a predetermined color interpolation filter to the bayer pattern according to the control signal.

According to the present invention, a luminance value of a set area of an input bayer pattern image is determined by using information of a central pixel to be interpolated and neighbor pixels, and the size of edge determination threshold values used for edge determination is adjusted according to the luminance value, whereby a color interpolation can be performed adaptively according to an image state.

Also, because a diagonal edge existing in a pre-set area is additionally determined, an edge region can be determined more accurately.

In addition, because a bit shift operation scheme is used for applying a filter for color interpolation to a pre-set area, application of a multiplier is omitted, making the interpolation apparatus have a compact size and high speed.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A through 2D illustrate examples of set areas of determined bayer pattern data according to an exemplary embodiment of the present invention;

FIGS. 5A through 5D illustrate pixels used to obtain a vertical-directional variation, a horizontal-directional variation, a left-upward diagonal-directional variation, and a right-upward diagonal-directional variation of a first set area according to an exemplary embodiment of the present invention;

FIGS. 9A through 9D illustrate detailed edge directions according to an exemplary embodiment of the present invention;

FIGS. 10A and 10B and FIG. 11A and 11B illustrate a process of determining detailed edges according to an exemplary embodiment of the present invention;

DETAILED DESCRIPTION OF THE PREFERRED EMBODIMENT

Figure 1:
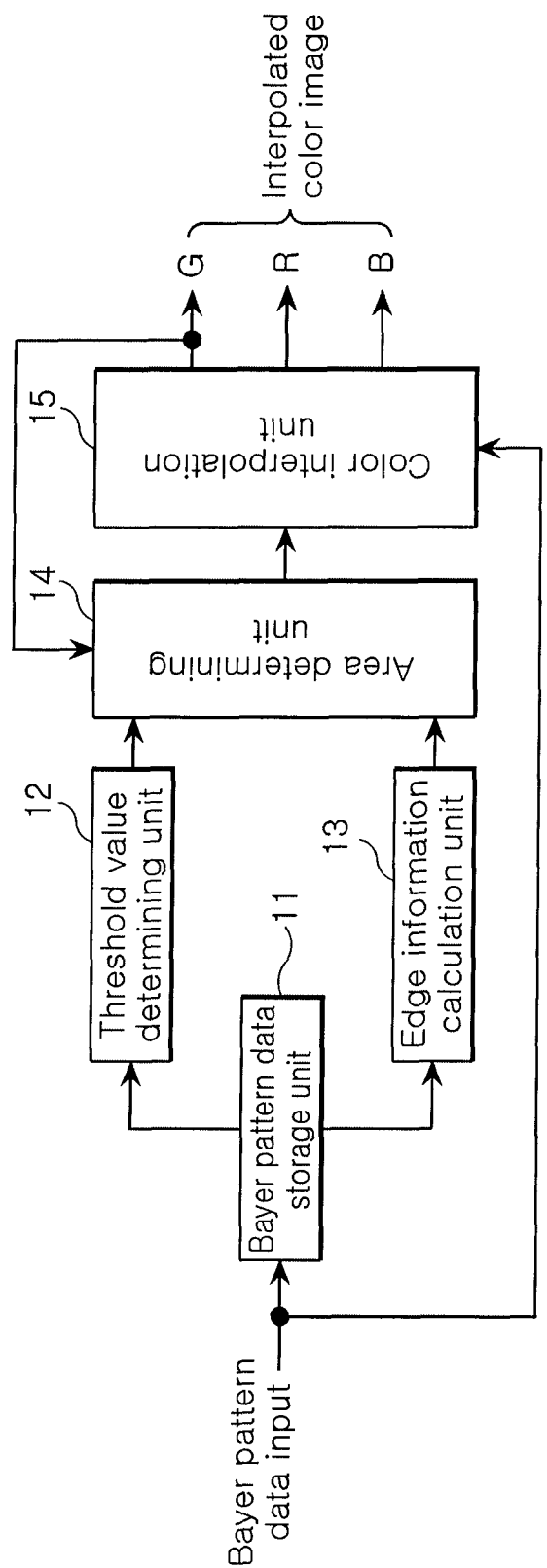
FIG. 1 is a schematic block diagram of a color interpolation apparatus according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of a color interpolation apparatus according to an exemplary embodiment of the present invention.

As shown in FIG. 1, a color interpolation apparatus according to an exemplary embodiment of the present invention includes a bayer pattern data storage unit 11 to store input bayer pattern data, a threshold value determining unit 12 to determine a plurality of threshold values used for edge determination from the bayer pattern data, an edge information calculating unit 13 to calculate multi-directional edge information by using a variation of a pixel value from the bayer pattern data, an edge determining unit 14 to determine a type of an edge present in a set area of a bayer pattern by using the threshold values and the multi-directional edge information, and a color interpolation unit 15 to apply a pre-set color interpolation filter according to the type of the edge existing in the set area. The color interpolation apparatus includes a processor configured to perform the functionality of the threshold value determining unit 12, the edge information calculating unit 13, the edge determining unit 14, and the color interpolation unit 15 as described herein.

The operation and effect of each element of the color interpolation apparatus according to an exemplary embodiment as illustrated in FIG. 1 will now be described in detail with reference to the accompanying drawings.

Bayer Pattern Storage Unit 11

The bayer pattern storage unit 11 stores bayer pattern data inputted from an image sensor. In particular, the bayer pattern storage unit 11 may store the entire bayer pattern data, which has been inputted from the image sensor, in the form of a plurality of areas set based on each pixel of the bayer pattern data. For example, as shown in FIGS. 2A to 2D, the bayer pattern storage unit 11 may determine the set areas in a 5×5 matrix form including 25 pixels. The set areas as shown in FIGS. 2A to 2D may be formed based on each pixel of the entire bayer pattern data. When the plurality of set areas of the bayer pattern data are set in the 5×5 matrix form, there may be a total of four types of patterns as shown in FIGS. 2A to 2D. FIG. 2A illustrates a set area in which a central pixel G13 is a green pixel, red pixels R8 and R18 are horizontally adjacent to the central pixel, and blue pixels B12 and B14 are vertically adjacent to the central pixel. FIG. 2B illustrates a set area in which a central pixel is a red pixel R13. FIG. 2C illustrates a set area in which a central pixel is a blue pixel B13. FIG. 2D illustrates a set area in which a central pixel G13 is a green pixel, blue pixels B8 and B18 are horizontally adjacent to the central pixel and red pixels R12 and R14 are vertically adjacent to the central pixel. The set area as illustrated in FIG. 2A is referred to as a first set area, the set area as illustrated in FIG. 2A is referred to as a second set area, the set area as illustrated in FIG. 2C is referred to as a third set area, and the set area as illustrated in FIG. 2D is referred to as a fourth set area, for the sake of brevity.

Threshold Value Determining Unit 12

Figure 3:
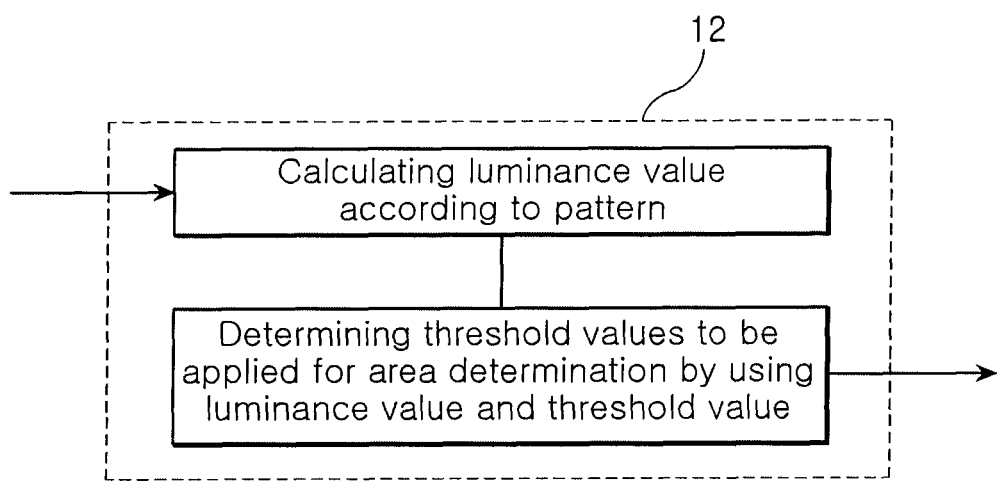
FIG. 3 is a detailed block diagram illustrating an operation of a threshold value determining unit of the color interpolation apparatus according to an exemplary embodiment of the present invention.

The threshold value determining unit 12 determines a threshold value for determining a type of an edge present in each corresponding set area according to a luminance value of each corresponding set area. FIG. 3 is a detailed block diagram illustrating an operation of the threshold value determining unit 12.

First, the threshold value determining unit 12 calculates a luminance value of each set area. For example, the threshold value determining unit 12 of the first set area may calculate a luminance value of each color by using a pixel value of each color by Equation 1 shown below, and may calculate an entire luminance value by using the luminance value of each color by Equation 2 shown below:

$$Lum\_g = \frac{G7 + G9 + G17 + G19}{8} + \frac{G13}{2} \quad \text{[Equation 1]}$$
$$Lum\_r = \frac{R6 + R16 + R10 + R20}{8} + \frac{R8 + R18}{4}$$
$$Lum\_b = \frac{B2 + B4 + B22 + B24}{8} + \frac{B12 + B14}{4}$$

$$Lum = \frac{Lum\_g + Lum\_r + Lum\_b}{2} \quad \text{[Equation 2]}$$

In Equations 1 and 2, Lum_g is a green luminance value, Lum_r is a red luminance value, Lum_b is a blue luminance value, and Lum is a luminance value of a set area.

Similarly, a luminance value of each color of the second set area is calculated by Equation 3 shown below, a luminance value of each color of the third set area is calculated by Equation 4 shown below, and a luminance value of each color of the fourth set area is calculated by Equation 5 shown below. A luminance value of each set area may be determined by Equation 2 shown above.

$$Lum\_g = \frac{G8 + G12 + G14 + G18}{4} \quad \text{[Equation 3]}$$
$$Lum\_r = \frac{R3 + R11 + R15 + R23}{8} + \frac{R13}{2}$$
$$Lum\_b = \frac{B7 + B9 + B17 + B19}{4}$$

$$Lum\_g = \frac{G8 + G12 + G14 + G18}{4} \quad \text{[Equation 4]}$$
$$Lum\_r = \frac{R7 + R9 + R17 + R19}{4}$$
$$Lum\_b = \frac{B3 + B11 + B15 + B23}{8} + \frac{B13}{2}$$

$$Lum\_g = \frac{G7 + G9 + G17 + G19}{8} + \frac{G13}{2} \quad \text{[Equation 5]}$$
$$Lum\_r = \frac{R2 + R4 + R22 + R24}{8} + \frac{R12 + R14}{4}$$
$$Lum\_b = \frac{B6 + B16 + B10 + B20}{8} + \frac{B8 + B18}{4}$$

The threshold value determining unit 12 may determine a threshold value used for a process of determining a type of an edge present in a set area determined by the area determining unit 14, according to the size of the luminance value Lum of each set area obtained by using Equations 1 to 5. In an exemplary embodiment of the present invention, a threshold value used for determining an edge of a set area is adaptively changed according to a luminance value of the set area. For example, when an initial edge determination threshold value used for the edge type determining process is inputted from an external source, namely, set by a user, the threshold value determining unit 12 may finally determine an edge determination threshold value to be applied for determining an edge of the region set by the area determining unit 14 by adjusting the size of the initial edge determination threshold value inputted from the external source according to the size of the luminance value calculated for the set area.

If a threshold value is applied regardless of the luminance value, when pixel values of a set area have large values overall, the components in each direction would have large values. Then, when a type of an edge is determined by using the values indicating the directional components and the fixed threshold value, there may occur an error in edge determination. Thus, in the exemplary embodiment of the present invention, the size of threshold values for edge determination is properly adjusted according to the luminance value, thereby improving accuracy of the determination of the set area.

Edge Information Calculating Unit 13

Figure 4:
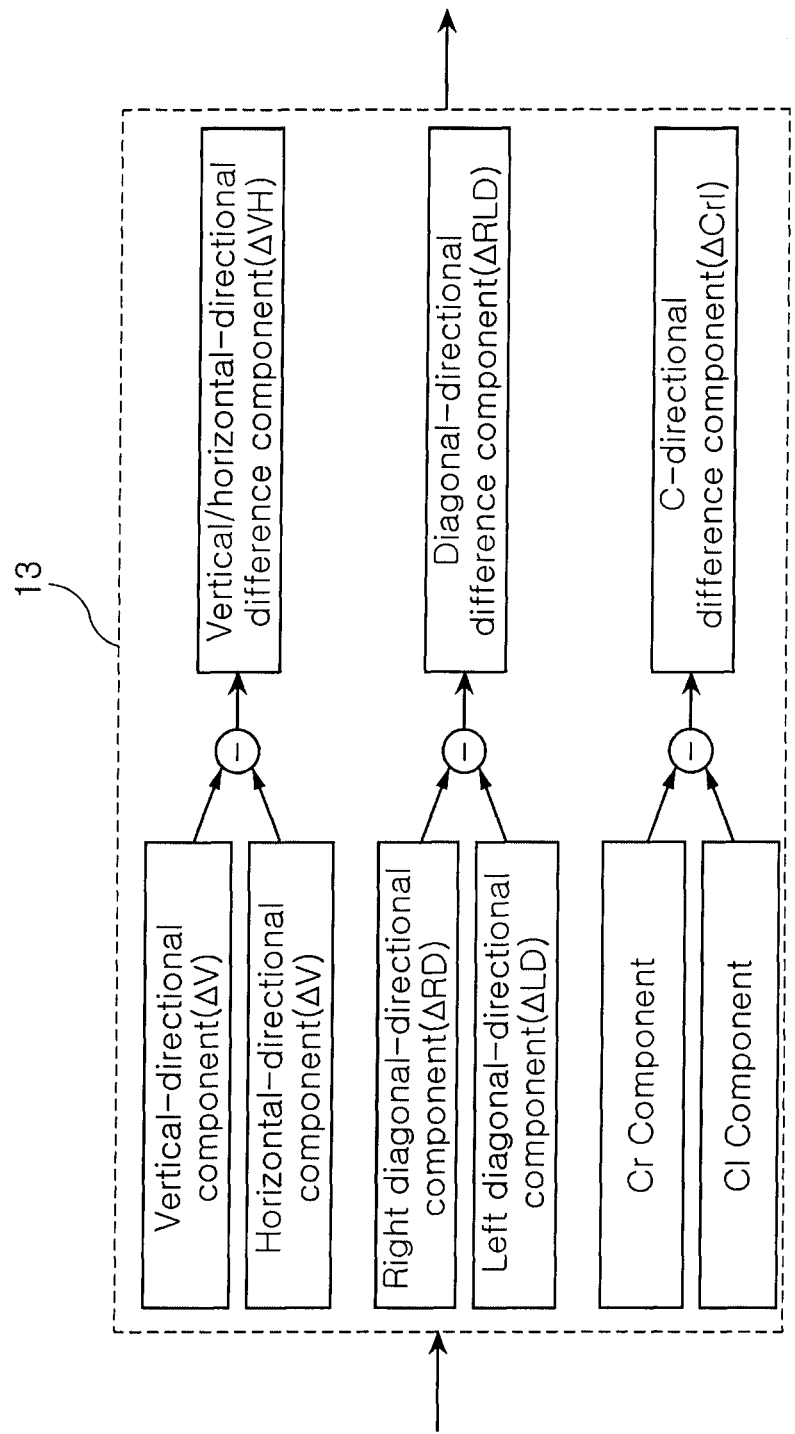
FIG. 4 is a detailed block diagram illustrating an operation of an edge information calculating unit of the color interpolation apparatus according to an exemplary embodiment of the present invention.

The edge information calculating unit 13 calculates multi-directional pixel value variations, i.e., horizontal, vertical, diagonal, and central variations of each corresponding set area, and calculates edge information of each set area by using the calculated multi-directional pixel value variations. FIG. 4 is a detailed block diagram illustrating the operation of an edge information calculating unit 13.

As for the edge information calculated by the edge information calculating unit 13, a vertical-directional variation, a horizontal-directional variation, a left-upward diagonal-directional variation, a right-upward diagonal-directional variation, and a left-right fine variation of a central portion are obtained, and each difference value between variations is previously calculated. The calculation by the edge information calculating unit 13 may be made according to pixel positions regardless of a pattern type. Hereinafter, the variations calculated for the first set area will be taken as an example, but this is merely illustrative and it would be understood that the same calculation is performed by using pixels existing at corresponding positions in a different type setting region.

FIGS. 5A to 5D illustrate pixels used to obtain the vertical-directional variation, the horizontal-directional variation, the left-upward diagonal-directional variation, and the right-upward diagonal-directional variation of the first set area.

First, in the first set area, a vertical-directional variation of a column including a central pixel and vertical-directional variations of the left and right adjacent columns are calculated to calculate a vertical-directional variation of the entire set area by Equation 6 shown below:

$$v\_1=|B12-B14|+|G13-G11+G13-G15|$$

$$v\_2=|R8-R6|+|R18-R16|$$

$$v\_3=|R8-R10|+|R18-R20|$$

$$\Delta V=v\_1+v\_2+v\_3 \qquad \text{[Equation 6]}$$

In Equation 6, $\Delta V$ is the vertical-directional variation of the set area.

Similarly, the edge information calculating unit 13 calculates a vertical-directional variation of a row including a central pixel and vertical-directional variations of rows adjacent up and down to the row of the central pixel, to calculate a vertical-directional variation of the entire set area by Equation 7 shown below:

$$h\_1=|R8-R18|+|G13-G3+G13-G23|$$

$$h\_2=|B12-B22|+|B14-B24|$$

$$h\_3=|B12-B2|+|B14-B4|$$

$$\Delta H=h\_1+h\_2+h\_3 \qquad \text{[Equation 7]}$$

In Equation 7, $\Delta H$ is the horizontal-directional variation of the set area.

The edge information calculating unit 13 calculates a variation in a left-upward diagonal direction including a central pixel and variations in its adjacent same diagonal directions, to calculate a left-upward diagonal-directional variation of the entire set area by Equation 8 shown below:

$$l\_1=|G7-G19|+|G13-G1+G13-G25|$$

$$l\_2=|B2-B14|+|B12-B24|$$

$$l\_3=|R8-R20|+|R6-R18|$$

$$\Delta LD=l\_1+l\_2+l\_3 \qquad \text{[Equation 8]}$$

In Equation 8, $\Delta LD$ is the left-upward diagonal-directional variation of the set area.

Similarly, the edge information calculating unit 13 calculates a variation in a right-upward diagonal direction including a central pixel and variations in its adjacent same diagonal directions, to calculate a right-upward diagonal-directional variation of the entire set area by Equation 9 shown below:

$$r\_1=|G9-G17|+|G13-G21+G13-G5|$$

$$r\_2=|B4-B12|+|B14-B22|$$

$$r\_3=|R8-R16|+|R10-R18|$$

$$\Delta RD=r\_1+r\_2+r\_3 \qquad \text{[Equation 9]}$$

In Equation 9, $\Delta RD$ is the right-upward diagonal-directional variation of the set area.

The edge information calculating unit 13 calculates the difference between the variations by using the calculated variations. Namely, the edge information calculating unit 13 calculates the difference component between the horizontal and vertical directions as represented by Equation 10 and the difference component in the diagonal direction as represented by Equation 11 shown below:

$$\Delta VH=|\Delta V-\Delta H| \qquad \text{[Equation 10]}$$

In Equation 10, $\Delta VH$ is the difference component between the horizontal and vertical directions.

$$\Delta RLD=|\Delta RD-\Delta LD| \qquad \text{[Equation 11]}$$

In Equation 11, 66 RLD is the difference component between the diagonal directions.

Figures 6, 7:
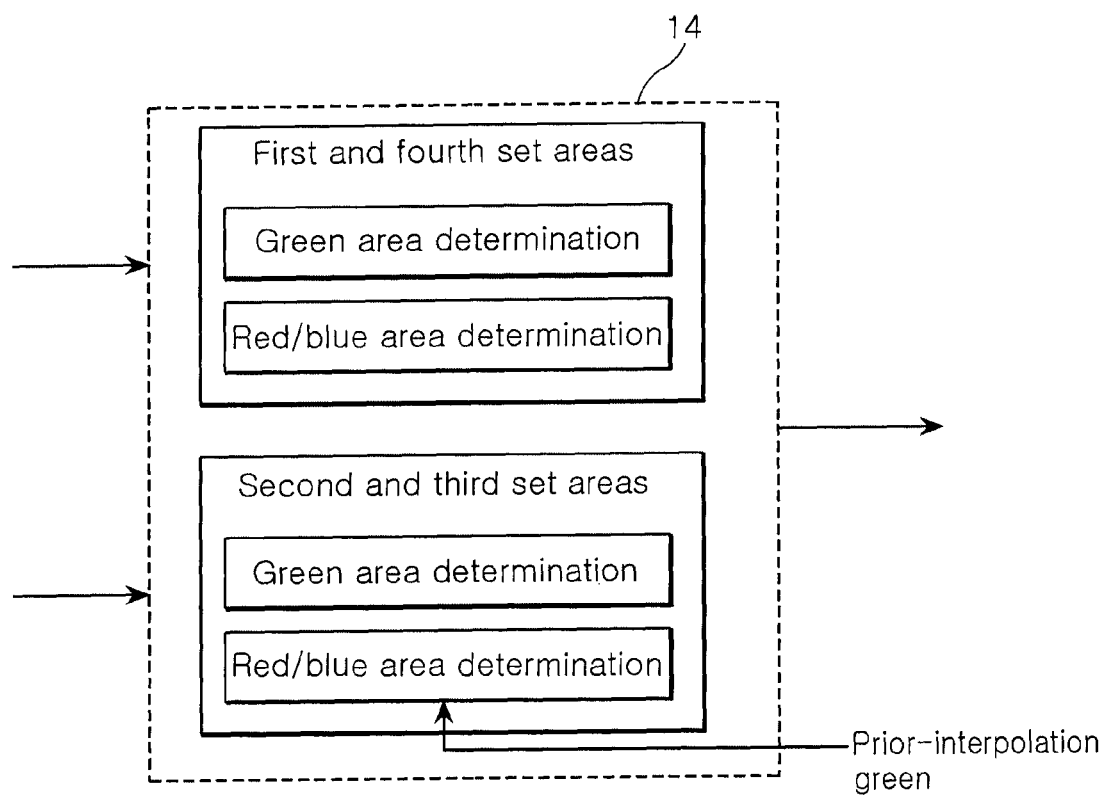
FIG. 6 illustrates pixels used for calculating a fine variation of a central portion of a set area according to an exemplary embodiment of the present invention.
FIG. 7 is a detailed view of an area determining unit of the color interpolation apparatus according to an exemplary embodiment of the present invention.

The edge information calculating unit 13 also calculates the difference component between the central directions by calculating a fine variation at the central portion of the set area. FIG. 6 illustrates pixels used for calculating the fine variation of the central portion of the set area. The edge information calculating unit 13 calculates the variation in the central direction as represented by Equation 12 shown below:

$$Cl=\uparrow G13-G7|+|G13-G9|$$

$$Cr=|G13-G9|+|G13-G7|$$

$$\Delta Crl=|Cr-Cl| \qquad \text{[Equation 12]}$$

Area Determining Unit 14

The area determining unit 14 determines the types of edges existing in the set areas by using the edge determination threshold values determined by the threshold value determining unit 12, the variations calculated by the edge information calculating unit 13, and the difference components. In an exemplary embodiment of the present invention, filters to be applied to the corresponding set areas for interpolation according to edge types are previously determined, and the area determining unit 14 performs interpolation by applying the pre-set corresponding filters according to edge types.

The area determining unit 14 determines edges according to colors of the central pixels of the set areas. Namely, the area determining unit 14 divides the first and fourth set area in which the green pixel is the central pixel, and the second and third set areas in which other color than the green color is the central pixel and performs region determination (edge type determination). This is because, in case of the first and fourth set areas in which the central pixel is green, the region determination may be performed by using the green information of the central pixel in determining the red and blue areas, but in case of the second and third set area in which the central pixels are not green, interpolated green should be used to use green information in determining the red and blue areas. FIG. 7 is a detailed view of the area determining unit. With reference to FIG. 7, the area determining unit 14 according to an exemplary embodiment of the present invention may separately check edge types of the first and fourth set areas and the second and third set areas.

Figure 8:
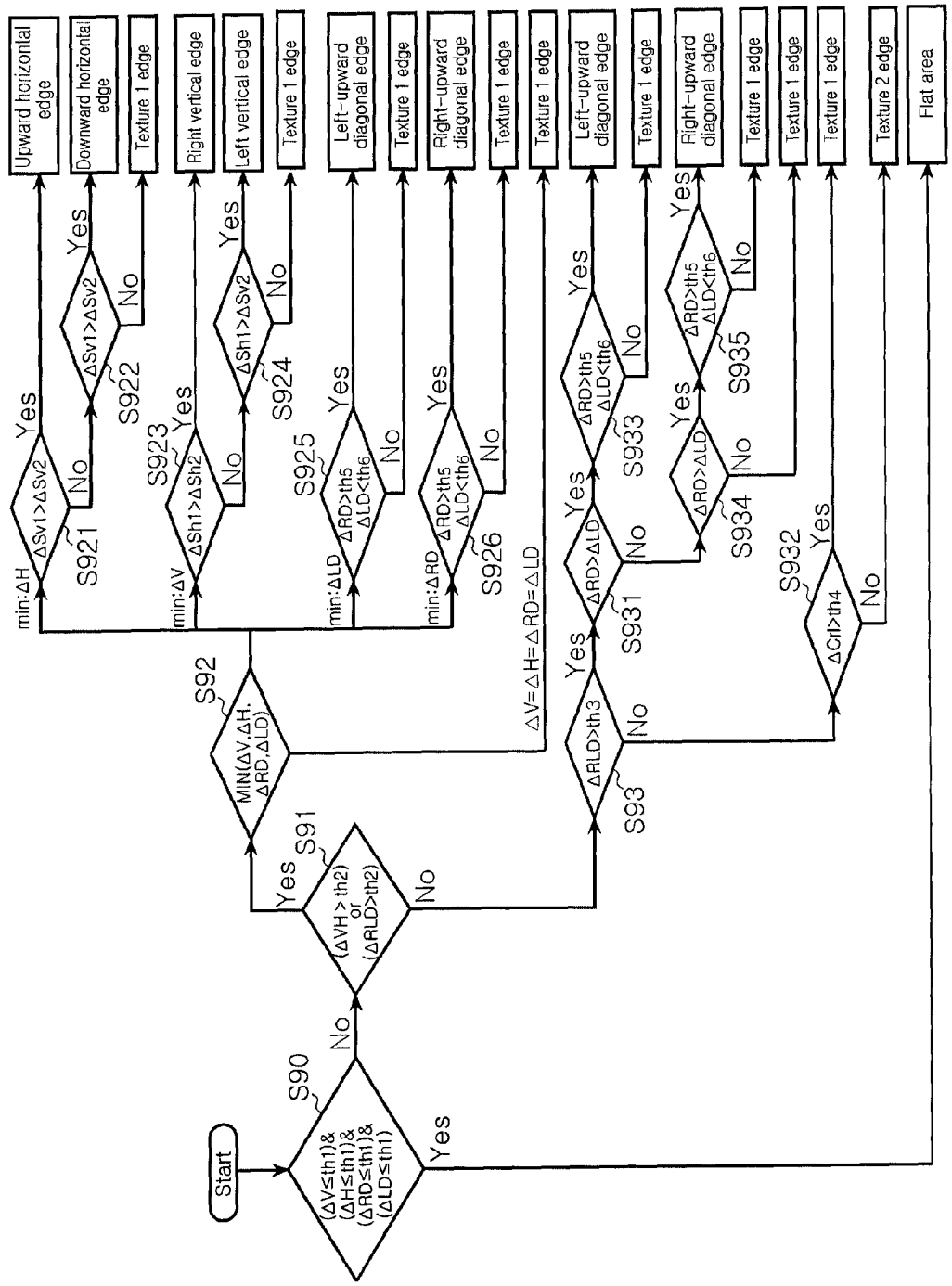
FIG. 8 is a flow chart illustrating an overall procedure for determining areas performed by the area determining unit of the color interpolation apparatus according to an exemplary embodiment of the present invention.

FIG. 8 is a flow chart illustrating the overall procedure for determining areas performed by the area determining unit.

First, determining of the green areas of the first to fourth set areas. In case of the first and fourth set areas, because the central pixel is green, the value of the green of the bayer pattern data needs not be changed. Thus, determining of the color areas of the first and fourth set areas may be performed like step S90. In FIG. 8, when the bayer pattern data is inputted, the threshold value determining unit 12 and the area determining unit 14 determine whether a central region of the bayer pattern data is flat based on the inputted bayer pattern data. The reason for determining whether the central region is flat is because if the region of the central pixel is flat, inputted green information is changed to be in harmony with neighbor pixels. Whether or not the central region is flat is determined by Equation 13 shown below:

$$(\Delta V \leq th1) \& (\Delta H \leq th1) \& (\Delta RD \leq th1) \& (\Delta LD \leq th1) \qquad \text{[Equation 13]}$$

In Equation 13, th1 is one of threshold values determined according to luminance values of the set areas by the threshold value determining unit 12. When Equation 13 is satisfied, the region of the central pixel is determined as a flat area and transmits a corresponding output signal to the color interpolation unit 15.

Next, regarding the second and third set areas, because their central pixels are not green, a green value should be created based on inputs of the threshold value determining unit 12 and the area determining unit 13. First, it is determined whether the central pixel areas are flat according to the method of Equation 13. If the central pixel areas are not flat, it is determined whether the central pixel areas are edge areas by Equation 14 shown below (S91):

$$(\Delta VH > th2) \text{ or } (\Delta RLD > th2) \quad \text{[Equation 14]}$$

In Equation 14, th2 is one of the threshold values determined according to the luminance values of the set areas by the threshold value determining unit 12. When the central pixel areas are determined to be edge areas according to Equation 14, the central pixel areas, namely, green areas to be interpolated are determined by Equation 15 shown below (S92):

$$\min(\Delta V, \Delta H, \Delta RD, \Delta LD) \quad \text{[Equation 15]}$$

For example, if a minimum value is $\Delta V$ according to Equation 15, an area of the central pixel is determined to be a vertical edge, and a corresponding output signal may be transmitted to the color interpolation unit 15. Meanwhile, if the central pixel area is not an edge according to Equation 14, it is determined whether the central pixel area is a diagonal edge (S93). Equation 16 shown below is for determining whether or not the central pixel area is a diagonal edge:

$$\Delta RLD > th3 \quad \text{[Equation 16]}$$

In Equation 16, th3 is also one of the threshold values determined according to the luminance values of the set areas by the threshold value determining unit 12. When the central pixel areas are determined to be edge areas according to Equation 16, the sizes of the $\Delta RD$ and $\Delta LD$ are compared. If $\Delta RD$ is larger than $\Delta LD$, the central pixel area is determined to be a left-upward diagonal edge, while if RD is smaller than $\Delta LD$, the central pixel area is determined to be a right-upward diagonal edge. And then, output signals corresponding to the determined areas are transmitted to the color interpolation unit 15. In Equation 16, if the central pixel area is not determined to be a diagonal edge, it is determined whether the central pixel area is a first texture edge or a second texture edge by Equation 17 shown below (S932):

$$\Delta Crl > th4 \quad \text{[Equation 17]}$$

The determining of red and blue area will now be described. Before determining the red and blue areas, determining of detailed areas in horizontal and vertical directions will be described. In an exemplary embodiment of the present invention, detailed areas refers to areas obtained by dividing the horizontal direction into a top horizontal direction and a bottom horizontal direction, and the vertical direction into a left vertical direction and a right vertical direction. FIGS. 9A to 9D illustrate four detailed areas according to an exemplary embodiment of the present invention. Specifically, FIG. 9A shows the bottom horizontal direction, FIG. 9B shows the top horizontal direction, FIG. 9C shows the right vertical direction, and FIG. 9D shows the left vertical direction. In order to determine the four detailed regions, different formulas may be used for the first and fourth set areas and second and third set areas.

First, in order to determine detailed areas of the first and fourth set areas, red and blue detailed areas are determined by using FIGS. 10A and 10B and Equations 18 and 19. FIGS. 10A and 10(b) illustrate the first set area. Specifically, FIG. 10A shows a horizontal calculation process, and FIG. 10B shows vertical calculation process.

$$\Delta Sv1 = |G13 - G7 + G13 - G17|$$

$$\Delta Sv2 = |G13 - G9 + G13 - G19| \quad \text{[Equation 18]}$$

$$\Delta Sh1 = |G13 - G17 + G13 - G19|$$

$$\Delta Sh2 = |G13 - G7 + G13 - G9| \quad \text{[Equation 19]}$$

In case of the second and third set areas, in order to determine detailed areas, interpolated green information is used. That is, red and blue areas of the second and third set areas are determined with reference to FIG. 11 and Equations 20 and 21. FIGS. 11A and 11B illustrate the second set area. Specifically, FIG. 11A shows a horizontal calculation process, and FIG. 11B shows a vertical calculation process. In this case, G'13 in FIGS. 11A and 11B and Equation 20 and 21 is defined as green interpolated by the green area determination and the color interpolation unit 15 when the central pixel is R13.

$$\Delta Sv1 = |G'13 - G12|$$

$$\Delta Sv2 = |G'13 - G14| \quad \text{[Equation 20]}$$

$$\Delta Sh1 = |G'12 - G8|$$

$$\Delta Sh2 = |G'12 - G18| \quad \text{[Equation 21]}$$

In determining the red and green areas, red and green detailed areas are determined by using Equations 18 to 21. In this case, a first texture edge is the area as the first texture edge described in the green area. Steps S921, S922, S923, and S924 in FIG. 8 show the process for determining detailed areas. Specifically, steps S921 and S922 show the horizontal direction determining process, and steps S923 and S924 show the vertical direction determining process.

Determining of the red and blue areas of the first and fourth areas will now be described. The red and blue at the first and fourth set areas are not positioned at the central pixels like the green at the second and third set areas. Thus, determining of the red and blue at the first and fourth set areas is similar to determining of the green at the second and third set areas. Namely, the red and blue at the first and fourth set areas are determined according to the process as described above with respect to the green area of the second and third set areas. However, there is a difference in that when the red and blue areas are determined to be edge areas, a minimum value is searched from among $\Delta V$, $\Delta H$, $\Delta RD$, and $\Delta LD$ to determine the areas, and in this case, the detailed area determining process with respect to the horizontal and vertical directions using Equations 18 and 19 is applied to obtain accuracy in the area determination. In addition, if the minimum value is $\Delta RD$ and $\Delta LD$, the diagonal area determination as the steps S933 and S935 is performed for the accuracy of area determination. Step S933 shows the left-upward diagonal determining process and step S935 shows the right-upward diagonal determining process. If the input bayer pattern data have the diagonal area, not the edge area, the detailed area determining process such as steps S933 and S935 is applied as it is for determining the red and blue areas of the first and fourth set areas, to perform detailed area determination.

Determining of the red and blue areas of the second and third set areas will now be described. In case of the second set area, a central pixel is red, and in case of the third set area, a central pixel is blue. Thus, in both cases, the red and blue areas are determined by using Equation 13 like the green area determination of the first and fourth set areas. If the blue area of the second set area and the red area of the third set area are determined to be edge areas, like the first and fourth set areas, a minimum value is searched from among ΔV, ΔH, ΔRD, and ΔLD to determine the areas, and in this case, the detailed area determining process with respect to the horizontal and vertical directions using Equations 20 and 21 is applied to obtain accuracy in the area determination. In addition, if the minimum value is ΔRD and ΔLD, the diagonal determination reference (base) as described above in determining the red and blue areas of the first and fourth set areas is applied as it is to obtain accuracy for area determination.

The area information (i.e., edge information existing in the set areas) determined through the processes as described above is transferred to the color interpolation unit 15.

Color Interpolation Unit 15

The color interpolation unit 15 applies color interpolation filters, which have been previously set according to the types of the edges, to a corresponding set area according to an edge type determined for each set area. The color interpolation unit 15 calculates an output value through a bit shift operation in calculation required for applying filters.

Figure 12A:
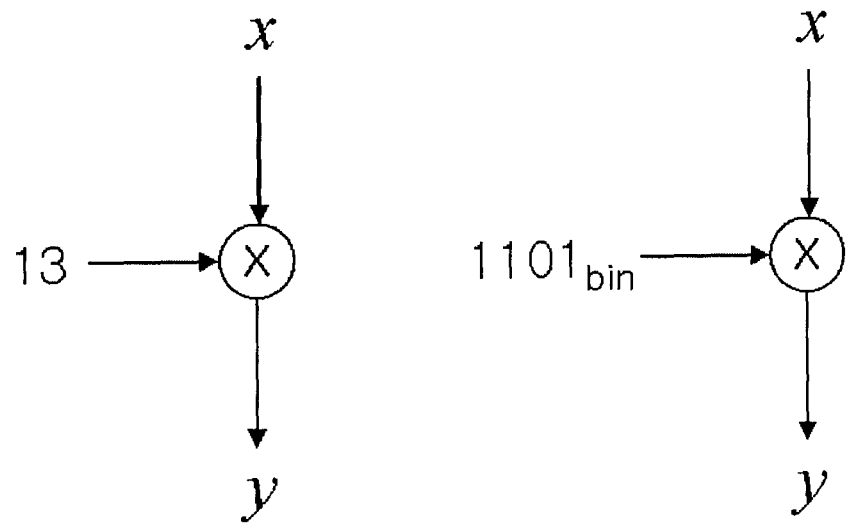
FIGS. 12A and 12B are views simply illustrating the concept of a bit shift operation performed by a color interpolation unit of the color interpolation apparatus according to an exemplary embodiment of the present invention.
Figure 12B:
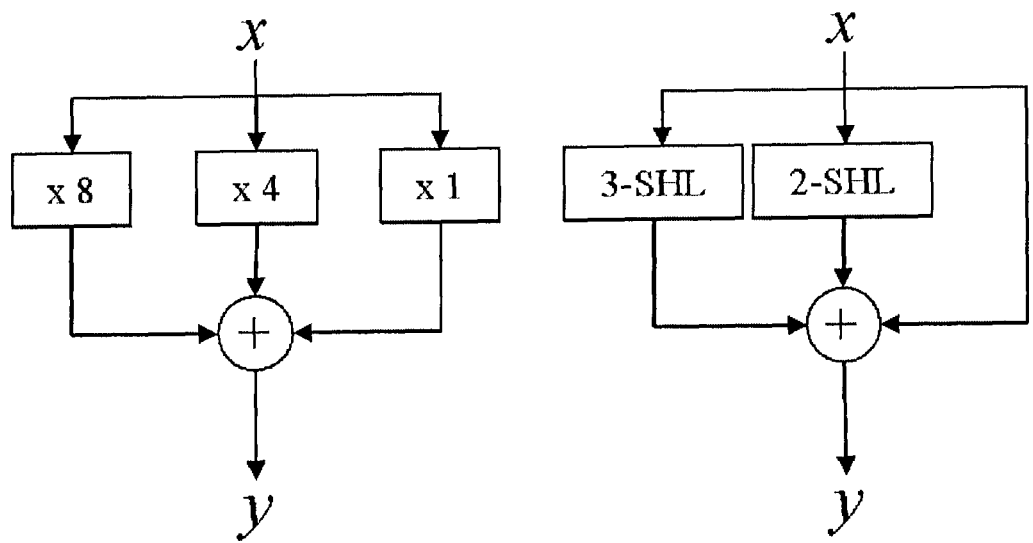

The color interpolation unit 15 calculates a final output value by using input bayer pattern data, the bit shift operation, and a multiplexer, for the bit shift operation. The final output value is obtained by multiplying the input bayer pattern data and the coefficient of a corresponding filter. In this case, in general, if a multiplier is in use, because the size of the multiplier is large, the overall size increases. In particular, if a complicated multiplying operation is to be performed, the size of the multiplier increases further. Thus, in an exemplary embodiment of the present invention, instead of using such multiplier, multiplying is performed by using the bit shift operation scheme in which the input bayer pattern data value is bit-shifted and bit-shifted values are added. FIGS. 12A and 12B are views simply illustrating the concept of the bit shift operation, in which a simple operation of "y=13·x" is applied as the bit shift operation scheme. FIG. 12A illustrates a multiplying operation simply using a multiplier. In this case, number 13 multiplied to an input value (x) can be expressed as a binary number of "1101". In the bit shift operation, multiplying operation is performed such that, with the multiplied number expressed as the binary number, respective bits (digits) of the binary number is multiplied to the input signal (x), and the obtained results are added. Namely, as shown in FIG. 12B, the input value (x) is multiplied to "$2^3(=8)$", "$2^2(=4)$" and "$2^0(=1)$", which are then added. In this case, multiplying "$2^3(=8)$", "$2^2(=4)$", and "$2^0(=1)$" to the input value (x) corresponds to shifting the input signal expressed by the binary number in the binary operation by 3 bits, 2 bits, and 0 bit leftward (to upper bits). For example, if the input value (x) is 110 in binary number (equivalent to 6 in decimal number), when the number is shifted by 3 bits, it becomes 110000 (equivalent to 48 in decimal number). Namely, the result obtained by shifting the input value by 3 bits is equal to the result obtained by multiplying 8 to the input value. In this manner, in the exemplary embodiment of the present invention, the multiplying operation can be simply performed by shifting the input value by bits and adding the results, and the use of a multiplier can be omitted.

Figure 13:
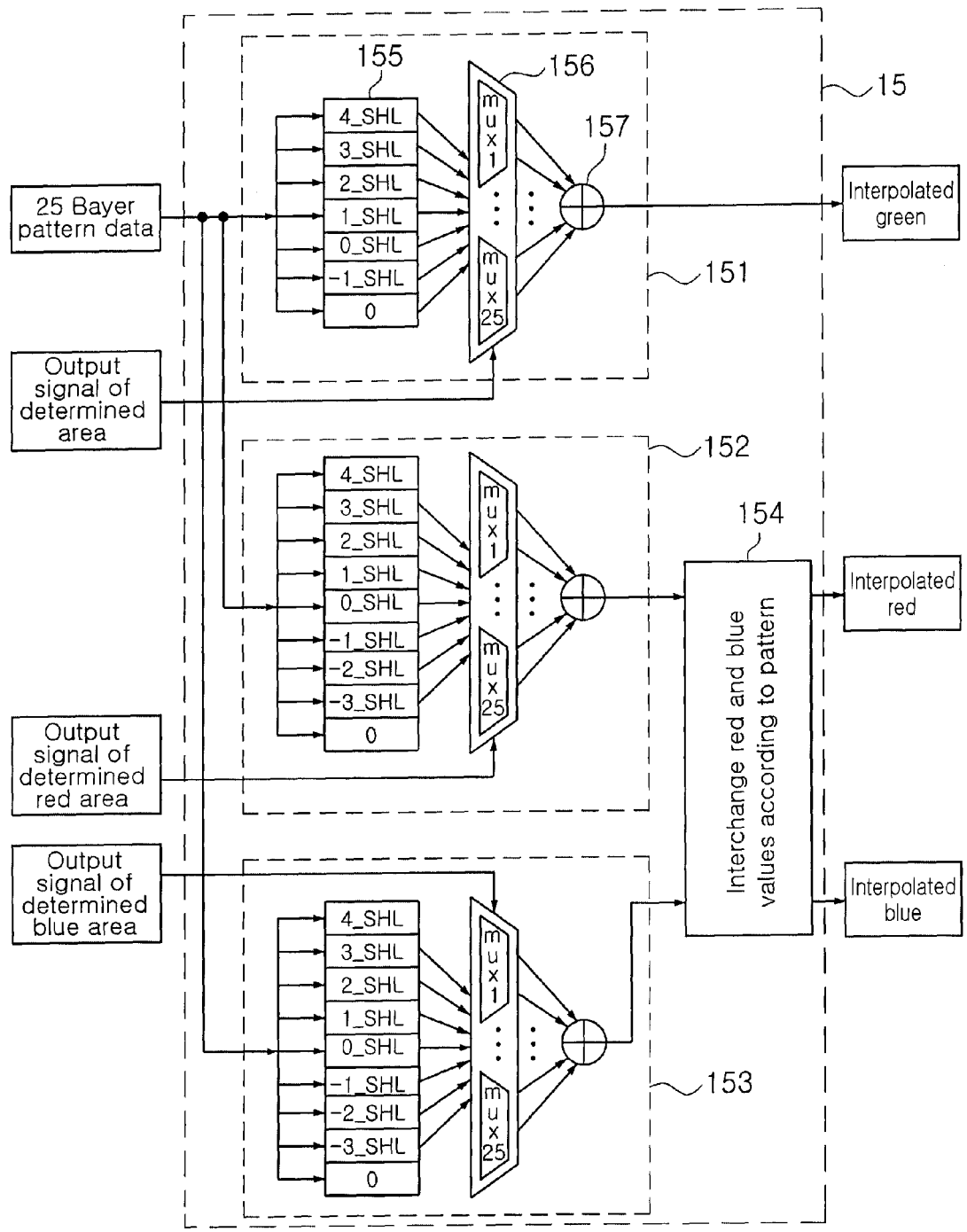
FIG. 13 illustrates in detail a bit shift operation structure of the color interpolation unit according to an exemplary embodiment of the present invention.

The multiplying operation performed through the bit shift operation according to an exemplary embodiment of the present invention will now be described with reference to FIG. 13. FIG. 13 illustrates in detail a bit shift operation structure of the color interpolation unit 15 according to an exemplary embodiment of the present invention. The color interpolation unit 15 includes a bit shifting unit 155 to perform shift shifting by n bits on inputted bayer pattern data, a multiplexer unit 156 including a plurality of multiplexers MUX1 to MUX25 for selectively outputting a bit shift value outputted from the bit shifting unit 155 according to an output signal of the area determining unit 14 as a control signal, and an adder 157 to add all the values outputted from the multiplexer unit 156. Because the output signal of the area determining unit 14 is outputted for the respective green, red and blue colors, the color interpolation unit 15 includes green bit shifting operation unit 151, a red bit shifting operation unit 152, and a blue bit shifting operation unit 153. The bit shifting operation units 151 to 153 include the bit shifting unit 155, the multiplexer unit 156, and the adder 157, respectively. Also, as mentioned above, when the first and fourth set areas are mutually compared and when the second and third set areas are mutually compared, it is noted that the green positions are the same but the red and blue positions are interchanged. Thus, by using such characteristics for the red and blue bit shifting operation, a result value interchanging unit 154 interchanges the red and blue values according to a pattern and outputs corresponding values. The bayer pattern data inputted by the color interpolation unit 15 turns a control signal of the 25 multiplexers based on the determined area of the central pixel, and the 25 multiplexer output values are finally output via the adder based on the control signal. Namely, the control signal of the multiplexers includes information corresponding to the color interpolation filters determined according to determination of an edge direction of the set areas of the bayer pattern. Color in formation existing at the central pixel of the bayer pattern data and information of two colors that do not exist undergo this process, so that final three color information are outputted as final output values. In other words, the black and white bayer pattern data is interpolated into a color image.

While the present invention has been shown and described in connection with the exemplary embodiments, it will be apparent to those skilled in the art that modifications and variations can be made without departing from the spirit and scope of the invention as defined by the appended claims.

What is claimed is:

1. A color interpolation apparatus, comprising:
a threshold value determining unit configured to
calculate a luminance value of each of a plurality of areas set based on each pixel of Bayer pattern data generated by an image sensor, and
determine edge determining threshold values used for determining each edge of the set areas;
an edge information calculating unit configured to
calculate pixel value variations in multiple directions of horizontal, vertical, diagonal, and central directions of the corresponding set areas by using pixel values of pixels included in each set area, and
calculate edge information regarding each set area by using the calculated multiple directional pixel value variations;
an area determining unit configured to determine an edge type of each set area by using
(i) the edge determining threshold values determined by the threshold value determining unit,
(ii) the edge information calculated by the edge information calculating unit, and (iii) green information or interpolated green information of a central pixel of the set area depending on whether or not a color of the central pixel of the set area is green; and a color interpolation unit configured to apply a color interpolation filter previously set according to the edge type to a corresponding set area according to the edge type determined by the area determining unit for each set area, wherein the threshold value determining unit is configured to
calculate color luminance values of respective colors of light in each of the plurality of set areas, and
calculate the luminance value of said each of the plurality of set areas by using the calculated color luminance values of the respective colors of light, and the threshold value determining unit is configured to calculate the luminance value Lum of each of the plurality of set areas by using $$Lum = \frac{Lum\_g + Lum\_r + Lum\_b}{2}$$

where Lum_g is a color luminance value of green, Lum_r is a color luminance value of red, and Lum_b is a color luminance value of blue in the set area.

2. The apparatus of claim 1, further comprising:
a Bayer pattern data storage unit for storing the entire Bayer pattern data inputted from the image sensor in the form of the plurality of areas set based on each pixel of the Bayer pattern data.

3. The apparatus of claim 1, wherein the threshold value determining unit is configured to
calculate the luminance value of each of the respective colors of light in each of the plurality of set areas by using pixel values of each color pixel included in the set area.

4. The apparatus of claim 1, wherein the edge information calculating unit is configured to calculate a vertical-directional pixel value variation of each set area by adding (a) a vertical-directional pixel value variation between the central pixel and pixels disposed at a column including the central pixel of each set area and (b) a vertical-directional pixel value variation between pixels included in columns adjacent left and right to the central pixel.

5. The apparatus of claim 1, wherein the edge information calculating unit is configured to calculate a horizontal-directional pixel value variation of each set area by adding (a) a horizontal-directional pixel value variation between the central pixel and pixels disposed at a row including the central pixel of each set area and (b) a vertical-directional pixel value variation between pixels included in rows adjacent up and down to the central pixel.

6. The apparatus of claim 1, wherein the edge information calculating unit is configured to calculate a left-upward diagonal-directional pixel value variation of each set area by adding (a) a left-upward diagonal-directional pixel value variation between the central pixel and pixels disposed at a left-upward diagonal line including the central pixel of each set area and (b) a left-upward diagonal-directional pixel value variation between pixels disposed in parallel and adjacent to the left-upward diagonal line including the central pixel.

7. The apparatus of claim 1, wherein the edge information calculating unit is configured to calculate a right-upward diagonal-directional pixel value variation of each set area by adding (a) a right-upward diagonal-directional pixel value variation between the central pixel and pixels disposed at a right-upward diagonal line including the central pixel of each set area and (b) a right-upward diagonal-directional pixel value variation between pixels disposed in parallel and adjacent to the right-upward diagonal line including the central pixel.

8. The apparatus of claim 1, wherein the edge information calculating unit is configured to calculate a central directional pixel value variation by using the central pixel of each set area and pixels adjacent to the central pixel in a diagonal direction.

9. The apparatus of claim 1, wherein the color interpolation unit is configured to
receive a control signal including information about the edge type of each set area inputted from the area determining unit, and
perform a bit shift operation to apply a value corresponding to a predetermined color interpolation filter to the Bayer pattern data according to the control signal.

10. The apparatus of claim 1, wherein the area determining unit is further configured to
determine whether or not a central region of the Bayer pattern data is a flat area based on the threshold values determined according to the luminance values of the set areas by the threshold value determining unit, a vertical-directional pixel value variation, a horizontal-directional pixel value variation, a left-upward diagonal-directional pixel value variation, and a right-upward diagonal-directional pixel value variation, and
transmit a corresponding output signal to the color interpolation unit when it is determined that the central region of the Bayer pattern data is a flat area.

11. The apparatus of claim 10, wherein when it is determined that the central region of the Bayer pattern data is not a flat area, the area determining unit is further configured to
determine whether or not the central region of the Bayer pattern data is an edge area based on the threshold values determined according to the luminance values of the set areas by the threshold value determining unit, a vertical-horizontal-directional pixel value variation, and a left upward diagonal-right upward diagonal-directional pixel value variation, and
determine a green area to be interpolated when it is determined that the central region of the Bayer pattern data is an edge area.

12. The apparatus of claim 1, wherein the threshold value determining unit is configured to calculate the color luminance values of each of the plurality of set areas by using $$Lum\_g = \frac{\Sigma \text{ four greens of diagonal-directional pixels of central pixel}}{8} + \frac{\text{green of central pixel}}{2}$$

$$Lum\_r = \frac{\Sigma \text{reds of left and right pixels of central pixel}}{4} + \frac{\Sigma \text{reds of rest pixels of the set area}}{8}$$

$$Lum\_b = \frac{\Sigma \text{blues of up and down pixels of central pixel}}{4} + \frac{\Sigma \text{blues of rest pixels of the set area}}{8}$$

where a central pixel of the set area is green, and up and down pixels of the central pixel are blue.

13. The apparatus of claim 1, wherein the threshold value determining unit is configured to calculate the color luminance values of each of the plurality of set areas by using $$\text{Lum\_g} = \frac{\Sigma \text{ four greens of diagonal-directional pixels of central pixel}}{8} + \frac{\text{green of central pixel}}{2}$$

$$\text{Lum\_r} = \frac{\Sigma \text{ reds of up and down pixels of central pixel}}{4} + \frac{\Sigma \text{ reds of rest pixels of the set area}}{8}$$

$$\text{Lum\_b} = \frac{\Sigma \text{ blues of left and right pixels of central pixel}}{4} + \frac{\Sigma \text{ blues of rest pixels of the set area}}{8}$$

where a central pixel of the set area is green, and left and right pixels of the central pixel are blue.

14. The apparatus of claim 1, wherein the threshold value determining unit is configured to calculate the color luminance values of each of the plurality of set areas by using $$\text{Lum\_g} = \frac{\Sigma \text{ four greens of up, down, left and right pixels of central pixel}}{4}$$

$$\text{Lum\_r} = \frac{\Sigma \text{ four reds of up, down, left and right-directional pixels of central pixel}}{8} + \frac{\text{red of central pixel}}{2}$$

$$\text{Lum\_b} = \frac{\Sigma \text{ four blues of diagonal-directional pixels of central pixel}}{4}$$

where a central pixel of the set area is red.

15. The apparatus of claim 1, wherein the threshold value determining unit is configured to calculate the color luminance values of each of the plurality of set areas by using $$\text{Lum\_g} = \frac{\Sigma \text{ four greens of up, down, left and right pixels of central pixel}}{4}$$

$$\text{Lum\_r} = \frac{\Sigma \text{ four reds of diagonal-directional pixels of central pixel}}{4}$$

$$\text{Lum\_b} = \frac{\Sigma \text{ four blues of up, down, left and right-directional pixels of central pixel}}{8} + \frac{\text{blue of central pixel}}{2}$$

wherein a central pixel of the set area is blue.

16. A color interpolation apparatus, comprising:
a processor configured to
calculate a luminance value of each of a plurality of areas set based on each pixel of Bayer pattern data generated by an image sensor;
determine edge determining threshold values used for determining each edge of the set areas;
calculate pixel value variations in multiple directions of horizontal, vertical, diagonal, and central directions of the corresponding set areas by using pixel values of pixels included in each set area;
calculate edge information regarding each set area by using the calculated multiple directional pixel value variations;
determine an edge type of each set area by using
(i) the edge determining threshold values determined by the threshold value determining unit,
(ii) the edge information calculated by the edge information calculating unit, and
(iii) green information or interpolated green information of a central pixel of the set area depending on whether or not a color of the central pixel of the set area is green; and
apply a color interpolation filter previously set according to the edge type to a corresponding set area according to the edge type determined by the area determining unit for each set area, wherein
the processor is further configured to
calculate color luminance values of respective colors of light in each of the plurality of set areas;
calculate the luminance value of said each of the plurality of set areas by using the calculated color luminance values of the respective colors of light; and
calculate the luminance value Lum of each of the plurality of set areas by using $$Lum = \frac{\text{Lum\_g} + \text{Lum\_r} + \text{Lum\_b}}{2}$$

where Lum_g is a color luminance value of green, Lum_r is a color luminance value of red, and Lum_b is a color luminance value of blue in the set area.

\* \* \* \* \*